United States Patent [19]
Parsons, Jr.

[11] 3,803,814
[45] Apr. 16, 1974

[54] DUST FILTER

[76] Inventor: Charles F. Parsons, Jr., 2030 Hassell Rd., Hoffman Est., Rolling Meadows, Ill. 60172

[22] Filed: Feb. 28, 1972

[21] Appl. No.: 229,746

[52] U.S. Cl.............. 55/287, 55/293, 55/302, 55/341, 55/432, 137/625.44, 137/625.46
[51] Int. Cl............................................ B01d 46/04
[58] Field of Search......... 55/96, 97, 283, 286, 287, 55/291, 293, 302, 303, 341, 432; 137/625.44, 625.46

[56] References Cited
UNITED STATES PATENTS

| | | | |
|---|---|---|---|
| 523,652 | 7/1894 | Heine | 55/303 |
| 1,603,837 | 10/1926 | Carson | 137/625.46 |
| 3,266,255 | 8/1966 | Barr | 55/273 |
| 3,397,575 | 8/1968 | Johnson | 55/302 |
| 3,545,470 | 12/1970 | Paton | 137/625.44 |
| 3,608,282 | 9/1971 | Ririe | 55/302 |

FOREIGN PATENTS OR APPLICATIONS

| | | | |
|---|---|---|---|
| 903,890 | 2/1954 | Germany | 55/302 |
| 879,681 | 10/1961 | Great Britain | 55/341 |

OTHER PUBLICATIONS
Uni-Cage Filters Bulletin 230-200-Young Industries, Muncy, Pennsylvania, 4/7/70, pages 1-9.

Primary Examiner—Bernard Nozick
Attorney, Agent, or Firm—Edmond T. Patnaude

[57] ABSTRACT

An air filter includes a compartmentalized housing with two banks of tubular filter elements being mounted in respective compartments separated by an air inlet compartment. A valve mechanism mounted in the housing below the filter elements selectively connects one of said banks between the air inlet compartment and the main air outlet of the filter and the other bank between the air outlet and a low pressure secondary outlet duct for cleaning the filter elements in the latter bank.

6 Claims, 4 Drawing Figures

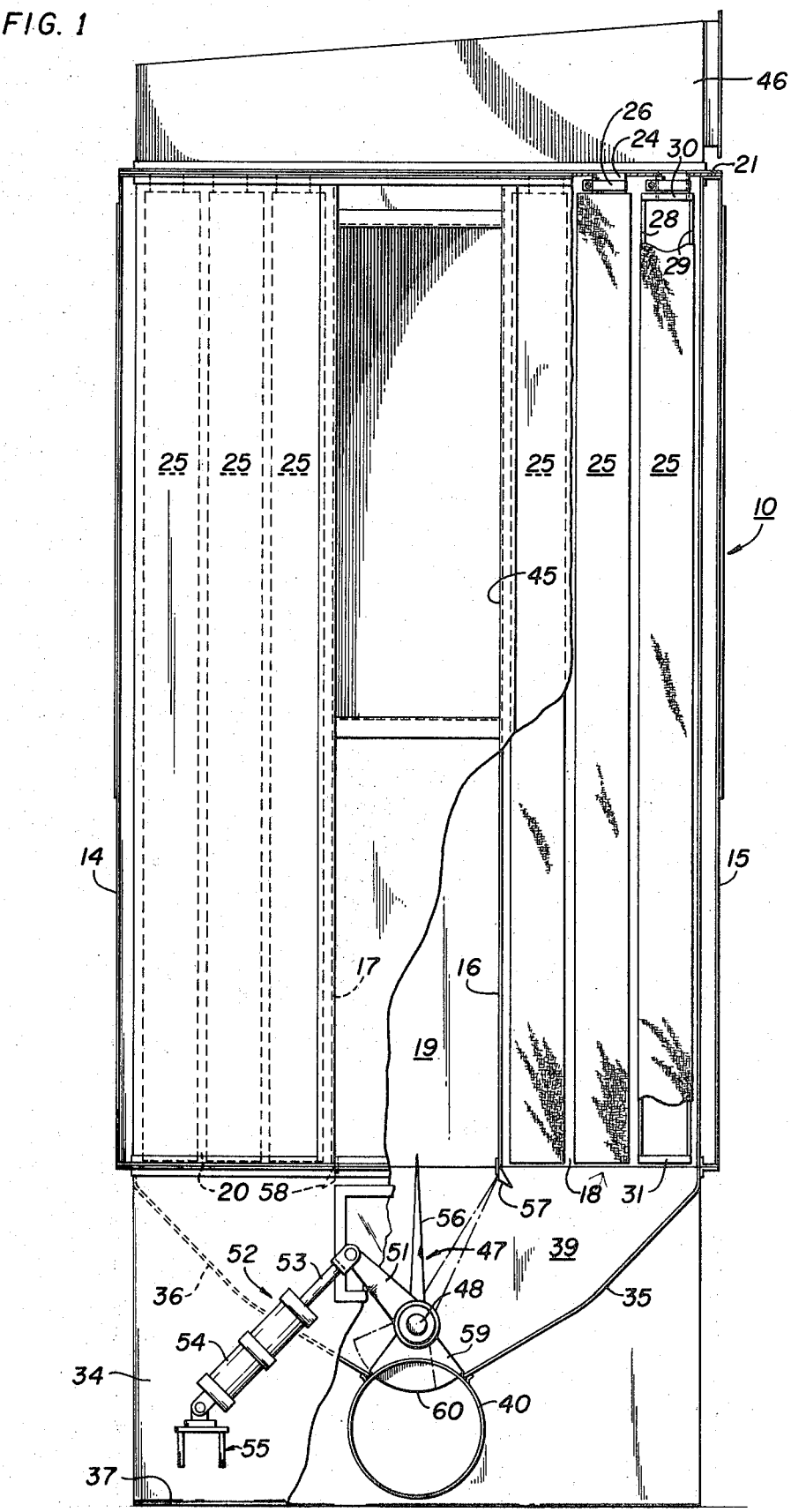

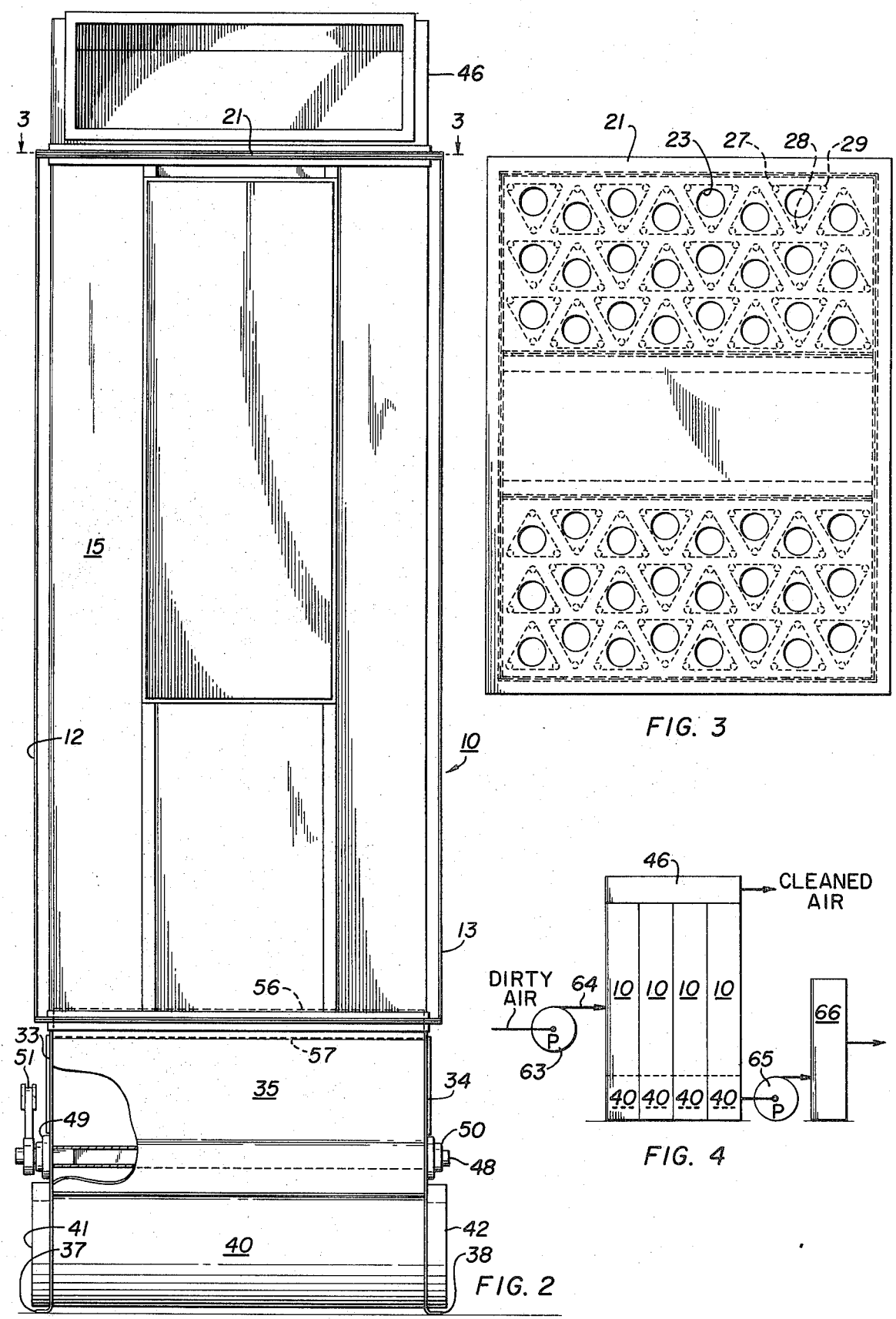

DUST FILTER

The present invention relates in general to an apparatus for filtering particulate matter from air or other gases, and it relates more particularly to an apparatus for handling the particulate matter which is deposited on a filter medium.

BACKGROUND OF THE INVENTION

Filters of this general type ordinarily employ a porous filter medium positioned across a conduit through which the particulate ladened air is passed. The particulates are thus deposited on the upstream side of the filter medium, and when the amount of particles thus deposited becomes so great as to appreciably affect the efficiency of the system, such particles must be removed. Various methods and apparatus have been devised for this purpose such as, for example, vibrating or shaking the media, scraping the surface of the media, and blowing high velocity air in a reverse direction through the filter media. With many of these systems the entire filter must be taken offstream in order to effect the filter cleaning operation. In others a portion of the filter elements are cleaned while the remainder of the elements remain on stream. However, at least some of the particulate matter when thus removed from the filter elements remains in the filter chamber and creates an atmosphere having an extremely high content of fine particles which adversely affects the efficiency of the system.

OBJECTS OF THE INVENTION

Therefore, an object of the present invention is to provide a new and improved apparatus for filtering air or other gases.

Another object of this invention is to provide a new and improved air filter which enables continuous on-stream operation while maintaining the filter media sufficiently clean to insure efficient operation thereof.

A further object of this invention is to provide a new and improved filtering system for use in industrial applications where large quantities of air ladened with particulate matter must be cleaned.

SUMMARY OF THE INVENTION

Briefly, the above and further objects may be realized in accordance with the present invention by providing a filter module having two banks of filter elements connected between an inlet conduit and an outlet conduit. A second outlet conduit is maintained below atmospheric pressure and is periodically and alternately connected to the upstream sides of each bank of filter elements simultaneously with the disconnection of the respective bank from the inlet duct. The second outlet duct which thus carries the previously collected particulate matter from the filter is connected to the inlet of a final filter such as a conventional dust collector from which the particles are removed in solid, cake form. By stacking a plurality of these relatively inexpensive filter modules together, all feeding a common final filter, a system which is more efficient in operation and more economical to manufacture and maintain is obtained.

BRIEF DESCRIPTION OF THE DRAWINGS

Further objects and advantages and a better understanding of the present invention may be had by reference to the following detailed description taken in connection with the accompanying drawings, in which:

FIG. 1 is a front elevational view of a filter embodying certain aspects of the present invention, a portion of the housing being broken away to show the interior parts thereof;

FIG. 2 is a side elevational view of the filter of FIG. 1;

FIG. 3 is a cross-sectional view taken along the line 3—3 of FIG. 2; and

FIG. 4 is a schematic diagram of a filter system embodying the present invention.

DETAILED DESCRIPTION OF THE DRAWINGS

Referring now to the drawings and particularly to FIGS. 1, 2 and 3, a filter 10 includes a housing having an upper section formed of sheet metal and having sidewalls 12 and 13, a rear wall 14 and a front wall 15. A pair of partitions 16 and 17 are mounted between the sidewalls 12 and 13 and divide the upper portion of the housing into three compartments 18, 19 and 20. A top wall 21 is connected to the side, front and rear walls 12–15 and the partitions 16 and 17 and is provided with a plurality of openings 23 arranged in sets over the respective compartments 18 and 20. A plurality of tubular connectors 24 are respectively welded to the underside of the top wall 21 over the holes 23, and a plurality of filter tubes 25 are secured to the connectors 24 by a plurality of clamps 26 and hang freely in the compartments 18 and 20.

The filter tubes 25 each include three rods 27, 28 and 29 mounted between a pair of upper and lower triangular end plates 30 and 31. The upper plate 30 has a central, circular opening aligned with the bore of the associated connector, and the bottom plate 31 is imperforate. A sleeve of a suitable filter material, such as a woven fabric, is tightly fitted over the rods and the end plates to provide a perforate, dust collecting surface.

Mounted beneath the compartments 18, 19 and 20 is the lower section of the housing formed by generally rectangular sidewalls 33 and 34 and front and rear walls 35 and 36. The sidewalls 33 and 34 provide the support legs for the filter 10 and are thus provided at the respective bottom edges with flanges 37 and 38. As best shown in FIG. 1, the front and rear walls 35 and 36 are fitted between the sidewalls 33 and 34 to define therewith a trough-like compartment 39 located below and communicating with the compartments 18, 19 and 20.

A tubular outlet conduit 40 is open along the top and connected to the front and rear walls 35 and 36 with the ends 41 and 42 thereof being welded to the sidewalls 33 and 34 and extending through aligned openings therein.

An air inlet 45 is provided in the sidewall 12 and opens into the central compartment 19. As this description proceeds, however, it will be evident that the location of the inlet may be in the other sidewall 13 or in the top wall 21, such location being selected so as to best fit the space available for the filter. A main air outlet duct 46 may be mounted over the top of the housing in communication with the openings 23 for carrying the cleaned air from the filter. A blower (not shown) may be mounted directly over the inlet 45 or in a duct connected thereto for blowing the air to be filtered through the filter 10 and to the main air outlet.

In order to control the flow of air from the inlet compartment 19 to one or both sets of filter tubes 25 mounted in the compartments 18 and 20, there is provided in accordance with the present invention a valve assembly 47 including a rotatable shaft 48 sealably journaled in suitable bearings 49 and 50 in the sidewalls 33 and 34. The shaft 48 extends through the bearing 49 and a crank arm 51 is mounted thereon. A fluid operated piston and cylinder assembly 52 has a piston arm 53 pivotally connected to the crank arm 51 and a cylinder 54 pivotally connected to a fixed support 55 mounted on the wall 33. A tapered valve member 56 is fixed to the shaft 48 and extends between the wall members 33 and 34. As best shown in FIG. 1, a pair of elongated sealing members 57 and 58 are mounted on and depend from the partitions 16 and 17 for engagement with the valve member 56 to seal off one or the other of the compartments 18 or 20 from the inlet compartment 19.

In order to controllably connect the outlet conduit 40 to one or the other of the compartments 18 and 20 or to seal off the conduit 40 from both of the compartments 18 and 20, a second valve member 59 is fixedly mounted on the shaft 48. The valve member 59 is generally pie-shaped and is preferably hollow to reduce the weight and cost thereof. The valve member 59 has a partially cylindrical valve surface 60 which sealably and slidably seats against the lower edge portions of the front and rear walls 35 and 36 with the central plane of the valve surface 60 coinciding with the central plane of the valve member 56. As shown in solid lines in FIG. 1, when the shaft 48 is positioned to locate the valve member 56 in a vertical position, the valve member 59 seals off the conduit 40 from the entire filter compartment. This is the position of the valve assembly 47 during the normal filtering cycle and air thus flows from the central inlet compartment 19 to both banks of filter tubes. When the shaft 48 is rotated clockwise by operation of the piston and cylinder assembly 52 to the position illustrated in phantom in FIG. 1, the bank of filter tubes in the compartment 18 is sealed off from the inlet compartment 19 and the valve member 59 is positioned to connect the compartment 18 to the conduit 40. A blower (not shown in FIGS. 1 and 2) is mounted in a suitable duct connected to the conduit 40 to suck air out of the conduit 40 to maintain the pressure therein below atmospheric pressure. With the valve assembly 47 in the right-hand position, air flows in a reverse direction through the bank of filter tubes 25 in the compartment 18 to dislodge the dust particles from the outer surface of the tubes and carrying them downstream of the outlet conduit 40. It will be apparent that when the shaft is rotated counterclockwise to position the valve member 56 against the seal 58, the inlet compartment 19 is disconnected from the compartment 20 and the compartment 20 is connected to the outlet conduit 40. Depending upon the concentration of particulates in the air being filtered, the operation of the cylinder and piston assembly can be programmed so as periodically to move the valve assembly 47 back and forth between the two filter tube cleaning positions or it can be programmed to dwell for a predetermined time in the intermediate position shown in solid lines in FIG. 1.

Referring now to FIG. 4 there is shown a schematic diagram of a filter system embodying the present invention including a blower 63 connected by a duct 64 to the inlets of a plurality of filter modules 10 stacked together. The filtered or clean air exits from the tops of the filters 10 into the outlet duct 46 after having passed through the filter tubes mounted therein. During a filter tube cleaning operation which may, as explained above, be carried on substantially continuously or intermittently, air from the conduit 40 containing a high concentration of particulate matter is pumped by a blower 65 to a final filter 66. The filter 66 may be a conventional bag type dust collector from which the particulates are removed en masse without the use of air. For optimum efficiency, the number of filter units 10 is selected to feed the concentrated, dirty air to the final filter 66 at such a rate as to permit operation of the filter 66 at maximum efficiency, to maintain the blower 65 in continuous operation, and preferably, to have only one of the filter modules 10 in a filter cleaning condition at any time. With this system a given volume of air can be handled with a much smaller final filter than would be required in the absence of the filter units 10, and because of the relatively high cost of final filters, the cost of the system of the present system is much less than prior art systems handling comparable quantities of air.

The filter system of the present invention thus removes the particulate matter from the air in a two step process. In the filter 10 the particulate concentration in the air exiting through the conduit 40 is substantially greater than that of the air entering the inlet 45 whereby the final filter 66 operates more efficiently than where the particulate concentration is low. Also, of course, the volume of air flowing through the filter 66 may be much lower than that flowing through the filter 10. For example, an air flow of 25 cfm per square foot of filter surface through the filter 10 is about normal and the flow rate through the conduit 40 will generally be between 50 percent and 100 percent thereof. Another advantage of the system of the present invention is that the necessarily large filter tubes 25 are never subjected to high back pressures or other mechanically or pneumatically induced forces which have frequently resulted in damage to the filter tubes in the prior art type filters. In a typical installation the tubes 25 are about 12 feet long and about 5 inches on a side, wherefore they are relatively fragile and easily damaged.

While the present invention has been described in connection with a particular embodiment thereof, it will be understood that those skilled in the art may make many changes and modifications without departing from the true spirit and scope thereof. Accordingly, the appended claims are intended to cover all such changes and modifications as fall within the true spirit and scope of the present invention.

I claim:

1. Filtering apparatus for removing particulate matter from a gaseous fluid, comprising a housing having an upper section and a lower section a plurality of imperforate partition means extending across the upper portion of said housing to divide said upper section into first and second filter compartments and an intermediate duct, said filter compartments and said duct opening onto said lower section, first and second sets of filter elements respectively mounted in said first and second filter compartments, a gaseous fluid inlet to said duct, a first gaseous fluid outlet disposed above and connected to said filter compartments and separated from said duct, a second gaseous fluid outlet disposed in said lower section of said housing, and a valve mounted in said lower section for controlling the flow of gaseous fluid from said duct to said filter compartments and from said filter compartments to said second gaseous fluid outlet, said valve being movable between a first position wherein the bottom of said first filter compartment is connected through said lower housing section to said second gaseous fluid outlet and sealed from said duct, and said duct is connected to said second filter compartment through said lower housing section, and a second position wherein the bottom of said second filter compartment is connected through said lower housing section to said second gaseous fluid outlet and sealed from said duct, and said duct is connected to said first filter compartment through said lower housing section.

2. Filtering apparatus according to claim 1 wherein said valve comprises a shaft mounted in said lower section, first and second valve members mounted on said shaft in said lower housing section above said second gaseous fluid outlet, said first valve member sealably engaging one of said partition means when said valve is in said first position, and sealably engaging another of said partition means when said valve is in said second position.

3. Filtering apparatus according to claim 1 comprising an outlet duct extending along the bottom of said lower housing section, said second gaseous fluid outlet opening from said lower housing section into said outlet duct.

4. Filtering apparatus according to claim 3 comprising first pump means for supplying gaseous fluid under pressure to said gaseous fluid inlet, and second pump means for drawing gaseous fluid from said outlet duct.

5. Filtering apparatus for removing particulate matter from a gaseous fluid, comprising a housing having an upper section and a lower section, first and second mutually parallel spaced apart partitions extending across said upper section to provide first and second filter compartments and an intermediate duct all opening onto said lower section, a gaseous fluid inlet to said duct, a gaseous fluid outlet from the bottom of said lower section, a shaft pivotally mounted in said lower section above said outlet, a first valve member fixed to said shaft and extending upwardly therefrom, a second valve member fixedly mounted on said shaft and depending therefrom, said valve members separating said lower section into first and second portions respectively disposed below said first and second filter compartments, said shaft being pivotable between a first position wherein said first valve element operatively engages said first partition and said second valve member opens said outlet to said first portion and seals said outlet from said second portion, and a second position wherein said first valve element operatively engages said second partition and said second valve element opens said outlet to said second portion and seals said outlet from said first portion.

6. Filtering apparatus according to claim 5, wherein said shaft is pivotable to a third position intermediate said first and second positions, when said shaft is in said third position said first valve member being spaced from both said first and second partitions and said second valve member closing both said lower portions from said outlet.

* * * * *